Patented Jan. 24, 1928.

1,657,195

UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

LITHOPONE AND PROCESS OF MAKING SAME.

No Drawing. Application filed April 6, 1922, Serial No. 550,185. Renewed October 26, 1923.

This invention relates to lithopone and to processes of making the same, and comprises, as a composition of matter, a new lithopone pigment in which the property of light-stability is combined with a hiding power, tinting strength, oil-absorption, and whiteness equal, or superior, to the best commercial lithopone heretofore made.

The discovery of lithopone as a pigment has been ascribed to Orr, who patented his process in 1874. Before that date the mixed precipitate of zinc sulphide and barium sulphate in equimolecular proportions (containing, theoretically, 29.4% of the former) as well as zinc sulphide alone, had received attention as a pigment due to its whiteness, fineness of division and availability of raw materials. It was Orr, however, who discovered the calcination process which is a necessary step in the art of lithopone production. Calcination is chiefly useful in increasing the hiding power, mixtures, of "raw" lithopone in paint vehicles having but little opacity. However, the other properties of the pigment, particularly the color, are likewise improved by calcination.

After addition of the calcination step, which resulted in a lithopone process substantially the same as that now in general use, production of the pigment began to assume importance. The increase in output was slow up to 1900. On that date the world production was only 5,820 tons per year. The first two or three small plants had just been built in the United States. During the past 20 years, however, the use of lithopone has increased rapidly, so that the 1920 United States production alone reached 90,000 tons as against an approximately 50% greater production of white lead and zinc oxide. This increase has been due to advantages of lithopone over the competing white pigments, white lead and zinc oxide. It is definitely superior to white lead in hiding power per unit weight, fineness of grain and color. Lithopone and zinc oxide are similar in hiding power and grain size, but the former pigment is superior in color when properly made. Likewise, lithopone shows much less tendency to react with paint vehicles than zinc oxide, with the resulting changes in consistency and other undesirable developments.

The above advantages, however, have been offset by one serious fault of lithopone: the property of discoloration or greying in the sunlight. Paints containing this pigment, when exposed to direct sunlight, develop various shades of grey. The color fades slowly in the dark but appears again on re-exposure. This has naturally been instrumental in preventing the extensive use of lithopone in exterior paints. It has also been a considerable disadvantage in white interior paints and particularly where greying may develop, as on window sills or other exposed surfaces.

This phenomenon of greying and the possibility of its prevention have naturally received extensive attention by lithopone producers for a number of years. The literature on the subject is largely confined to patents covering processes purporting to allow production of light-stable lithopone. Some 15 processes, differing in principle or detail, have been patented. The diversity of patented processes and their general lack of success seems to have a two-fold cause: complexity of the problem itself, requiring for its solution research facilities and expenditure of time and money not ordinarily available, together with the presence in the field of early patents chiefly directed toward "short-cut" methods, which are uniformly unsuccessful.

To bring out clearly the important differences between my invention and prior processes, and to facilitate an understanding of the advance that I have made in the art of lithopone production, I shall outline briefly the processes of making light-stable lithopone which have heretofore been proposed. These processes may be classified into three groups as follows:—

*Group I.—Substances added to calcined lithopone to prevent greying.*

Alberti—German Patent #163,455 (1904). Barium peroxide is added to the quenched, washed lithopone prepared as usual.

Alberti—German #170,478 (1905) British #13,455 of 1905. Hydrogen peroxide or the alkali-metal or alkaline earth metal peroxides are added to the quenched, washed lithopone prepared as usual.

Ostwald—German #202,420 (French #364,713). Water-soluble, non-acid compounds which precipitate zinc solutions (e. g. sodium carbonate and bicarbonate) are added to the usual (quenched) raw product.

Steinau—German #197,166 (British #11,803 of 1905). Alkali nitrites alone or mixed with magnesium or zinc carbonate are added to the lithopone.

Ephraim—British #7,819 of 1906. Same as Ostwald disclosure above, and mentions also the use of alkali phosphates.

Brase—German #254,291 (1909). Alkali-metal nitrate is added to the ordinary lithopone while the latter is wet or dry.

Rosenthal—German #229,642 (French #407,642). Alkaline earth metal phosphates or silicates, together with salts of alkali metals are mixed with an intermediate product or with the finished lithopone.

Rosenthal—German #254,639. Same as German Patent 229,642 above except that free alkalies are used in place of alkali-metal salts.

Allendorff—German #202,253. British #23,687 of 1906. Soaps of aluminum or of alkaline earth metals are mixed with the ordinary lithopone after calcination.

The treatment of the lithopone with various other reagents such as barium nitrate and soluble nitrates has also been suggested.

The above patents cover addition of many compounds to lithopone at various stages of its production. These may be reclassified as follows, examples of each type being included. In addition, two classes not specifically included in the patents appear below: viz, Classes (3) and (6), which may have some degree of merit.

(1) Salts precipitating zinc compounds: barium sulphide, sodium phosphate plus hydroxide.

(2) Metal soaps: zinc stearate.

(3 Reducing compounds: sodium sulphite, barium sulphite.

(4) Oxidizing compounds: barium peroxide, hydrogen peroxide, barium nitrate, calcium nitrate, ammonium nitrate.

(5) Salts of alkaline reaction: sodium carbonate, sodium bicarbonate, borax. (These also fall under (1).)

(6) Acid salts: sodium acid sulphate.

(7) Miscellaneous: magnesium carbonate plus magnesium nitrite.

Experiments were carried out under my direction to test the above processes. Each of the compounds or mixtures of compounds referred to in the above table as typical of the seven classes, was thoroughly tested; thus, hydrogen peroxide, barium nitrate and barium peroxide, were tried as typifying the class of oxidizing compounds. The procedure, which was the same in all cases, was as follows:—

The lithopone was prepared in accordance with the regular process familiar to those skilled in the art, that is the pigment was precipitated, filter pressed, calcined, and wet ground as usual, then removed from the plant process after the wet grinding. This lithopone, if finished in the regular way, would be definitely light-sensitive. Portions of the material thus obtained, were ground in a pebble mill for 24 hours with a 5% solution or suspension of each compound referred to above. (An exception was made in the case of the sodium bisulphate, where a 1% solution was used.) This procedure allowed a very thorough mixing of the added material with the lithopone, and sufficient time for any reaction which might result to proceed far toward completion. The pigment thus treated was then washed with distilled water by decantation. Ten such washings were made, samples of the lithopone being removed and tested for light-sensitiveness after each washing. The test comprised sealing the wet lithopone between two glass slides, and exposing to the light of a flaming carbon arc. Half of the circle of lithopone was exposed to the light, the other half covered with a piece of black paper, so that removal of the latter would allow a sharp comparison.

Classes 1, 2, 3 and 7 showed no appreciable effect, the lithopone greying badly after treatment.

It was found, however, that several of the salts in the other classes possessed the property of rendering the pigment less sensitive to light when present in large quantities, but that in nearly every case, the effect of the added salt decreased with washing. Under Class 5, the alkaline salts, it was found that sodium carbonate and bicarbonate caused a slight reduction of the light-sensitiveness before washing. This disappeared, however, after one or two washings.

Class 4, oxidizing agents, were more active. Barium nitrate, for instance, produced a pigment which remained less light-sensitive than a regular lithopone after five or six washings. Further washing increased the light-sensitiveness. Other oxidizing agents, peroxides and chlorates, were tried, but did not produce results sufficiently marked to be of promise. Other nitrates: those of calcium and ammonium, produced the same effect as barium salt. After a systematic study of the subject, however, it was proved that these nitrates only decreased to some extent the light-sensitiveness of the lithopone, and never brought it down to a point approaching light-stability. Likewise, washing to a sufficient extent to make the lithopone useful for grinding in oil nearly eliminated the decrease in light-sensitiveness. It is well known to those skilled in the art that the presence of water-soluble salts in lithopone in appreciable amount results in difficulties when the lithopone is ground into paints. The consistency of the paint is apt to change greatly and such phenomena as "livering" result. In view of the above considerations it must be concluded that the method of treating with nitrates is entirely impracticable from an operating standpoint.

Class 6, acid salts, likewise showed the same effect. Sodium bisulphate decreased the light-sensitiveness of the lithopone, as did also treatment with other acid salts. Here again, however, the decrease in light-sensitiveness was not sufficient to be of importance from an operating standpoint.

From the above rather extensive experimental results, in which all procedures of any promise were intensively investigated, it must be concluded that such "short-cut" methods as addition of foreign substances to lithopone are of no practical value. At best, the light-sensitiveness is slightly decreased over that of the average commercial product. In no case was a lithopone produced which was satisfactory for grinding in oil or paint vehicles, and which at the same time approached light-stability, even remotely, when subjected to the test described above.

*Group II.—Miscellaneous methods of preventing greying.*

H. Blücher—Anskunftsbuch fur die Chemische Industrie 1908–1909 (page 1294). A process is described for imparting light-stability to lithopone comprising precipitation from hot concentrated solutions and addition to the precipitate of less than 1% of freshly precipitated magnesium hydroxide and sodium chloride. The precipitate is washed, dried, powdered, mixed with 3% ammonium chloride and calcined. The glowing mass, while still hot, is thrown into cold water for quenching.

O'Brien—Journal of Physical Chemistry, 1915, pages 113–114. The darkening of lithopone in sunlight is ascribed to the liberation of metallic zinc by decomposition of zinc sulphide. It is stated to be impossible to make lithopone that will not darken, unless there is a film protection of some kind over the zinc sulphide. The film recommended is one of zinc oxide. It was stated that at least 3% of zinc oxide must be present in the lithopone to have this effect.

Cawley—British #1,915 (1881). Addition of about 5% of magnesium oxide to the lithopone before calcination is said to decrease light-sensitiveness.

Engelman—German Patent #264,904 (1912). Claim 1: Procedure for production of a lithopone stable against light and weather in which the lithopone is treated during precipitation with sulphur dioxide.

Walker, Wilkins and Lones—British Patent #19,308 (1896). According to this patent zinc sulphide is heated to a dull red heat for thirty minutes with an excess of sulphur. While still hot the mass is thrown into cold water.

Bayer and Company—German Patent #259,953 (1911). Lithopone is treated by means of an electrical current to render it light-stable.

Ostwald—German #202,709 (French #368,301). States that light-stable lithopone can be produced by calcining and quenching with exclusion of free oxygen.

Ephraim—British #16,516 of 1906. Same as Ostwald German Patent #202,709.

Experiments made for the purpose of verifying the procedures included under Group II as methods of overcoming light-sensitiveness of lithopone show conclusively that these procedures cannot be used with success. The last two patents above-mentioned claim light-stability of a product calcined in absence of air. In the experimental work carried out under my direction this possibility has been very thoroughly tested. It has been found that raw lithopone produced in the regular manner, that is, in an operating lithopone plant, when calcined with exclusion of air, is still light-sensitive. Such calcination has been accomplished with very careful precautions, both on a laboratory scale and in plant-scale equipment. The exclusion of oxygen has been so complete that its presence could not be detected by the most delicate tests available—readily showing .01%. In all cases, however, the product possessed a light-sensitiveness of the same order as if the calcination had been made with the access of the amount of air usually present in the plant operation. On the other hand, lithopone free from chlorides (see below) has been calcined with free access of air, and no light-sensitiveness resulted. The process claimed in the above patents are therefore inoperative.

*Group III.—Exclusion of chlorides to prevent greying.*

Fischer—(Chemische Fabrik Marienhütte)—British Patent #17,956 of 1903. French #334,944 (1903). Describes a process for producing weather-resisting lithopone unaffected by light in which such substances only are employed as are free from chlorine and its compounds substantially as described.

Fischer's disclosure in the above numbered patents I have ascertained to be substantially correct: For different lots of lithopone prepared under conditions otherwise similar, the light-sensitiveness of the products will vary with the percentage of chloride present in the raw pigment. The following table contains some of my experimental results chosen as illustrating this point. The solutions used to precipitate the lithopone were similar in every respect except in chloride content. The procedure was likewise the same. The raw pigments produced were consequently similar except in variation of percentage of combined chlorine present. The calcination and subsequent washing of the different products was also similar.

| Per cent Cl in raw lithopone | Degree of greying of calcined lithopone |
|---|---|
| 1.33 | Very badly affected. |
| 0.24 | Badly affected. |
| 0.11 | Affected +. |
| 0.063 | Affected. |
| 0.045 | Affected —. |
| 0.044 | Affected —. |
| 0.033 | Affected —. |
| 0.030 | Slightly affected. |
| 0.028 | " " |
| 0.027 | " " |
| 0.027 | " " |
| 0.019 | Not affected |
| 0.010 | " " |
| 0.009 | " " |

The test used comprised exposure of a moderately thin water paste of the lithopone, protected by a thin cover glass to prevent evaporation of the water, to the sunlight for a period sufficient to turn ordinary light-sensitive commercial lithopones a dark slate grey—the shade of the first sample in the table. These and similar results obtained with varying raw materials and various types and sizes of equipment have definitely proved the direct relation between chlorine content of the raw lithopone and light-sensitiveness of the product.

The chlorides which impart light-sensitiveness to the lithopone come either from impurities in the raw materials employed, for example, zinc ash from galvanizing operations in which ammonium chloride is used, or from salt (sodium chloride) added after the precipitation of the raw pigment.

Now it has been the natural assumption in the prior art that the discovery of a method of overcoming the light-sensitiveness of lithopone would lead directly to the production of a commercial light-stable pigment; but unfortunately, this has not proved to be the case. The determination of the responsibility of chlorides for light-sensitiveness, and the consequent establishing of the possibility of production of a light-stable lithopone, left us not much closer than before to the realization of production of a marketable pigment of this type.

This situation is due to another more favorable and very important effect of chlorides during the regular calcination operation. Their presence, for some reason which has not been definitely established, preserves the pure white color of the pigment during the muffling treatment. In the regular process of manufacture about 1% of chlorine in the form of one of the chlorides is present in the raw lithopone as it is thrown into the muffles. Under these circumstances, it is a simple matter to obtain a calcined product of satisfactory whiteness (high brightness and low saturation or depth of tint). However, when an effort is made to calcine, in the usual manner, a pigment substantially free from combined chlorine, a very unsatisfactory product results. The chief disadvantage is the "off" color. This varies, when the usual type of muffle, with firebrick or fireclay walls, is used, from an ivory tint to a buff.

As soon as I ascertained that elimination of chlorides was only the first step toward the production of a marketable light-stable lithopone, active attention was given to improving the color. The following experiments indicate what was finally ascertained to be the definite cause of this discoloration during muffling. These are typical of a very large number of similar experiments confirming the conclusion.

Experiment I. Two samples of the same chlorine-free lithopone precipitate were calcined in the same electrically heated muffle at 650° C. for 45 minutes, one in an open vessel, the other in an atmosphere of steam. The first was distinctly yellow, the second a satisfactory white. As the material was in lumps of about the same size in both vessels, I regard these results, which were duplicated a number of times, as conclusive.

Experiment II. In my laboratory experiments it has been found that an exposure of chlorine-free lithopone at 650° C. to the air for a period of five seconds before quenching is sufficient to give the pigment a decided yellow color. On examination of such a product, the surfaces of the lumps were found to be colored yellow, while the interior of the lumps remained white.

Similar raw lithopone calcined in the present plant type of muffle, or in laboratory-size muffles without special precautions to exclude the air, always yielded a yellow product.

On the basis of the above experimental results, which have been abundantly verified by large scale operations, it was definitely concluded that the discoloration of chlorine-free lithopone during calcination was due to oxidation by air reaching the pigment. This discoloration of chlorine-free lithopone has not, to my knowledge, been previously discussed in the lithopone literature. This is doubtless due to the fact that it has been routine practice to have chlorides present during calcination, which in turn eliminates the tendency toward yellowing.

If the yellowish tint developed is very slight, it can be corrected by bluing,—the addition of ultramarine blue to the calcined pigment. At best this method of correcting the color is unsatisfactory: the addition of a blue pigment does not add blue light to that reflected from the lithopone but rather neutralizes the yellow color by reducing the amount of light of this latter hue reflected. This decreases the total brightness and tends to throw the color of the lithopone toward neutral grey. Even with lithopones only slightly yellow, this is a disadvantage. With more deeply tinted pigments bluing to a satisfactory color is impossible. Consequently, the only practical method of producing a lithopone of a satisfactory white color, either with or without bluing, is by calcining in such a way that the yellow tint always present is kept at a minimum.

It is obvious that unless a light-stable lithopone possesses a satisfactory white color equal to that of the regular grade of lithopone on the market, its sale on a competitive basis will be impracticable. Consequently, this step in my process—calcination of the chlorine-free pigment with substantial exclusion of the air or other gases containing free oxygen—is extremely important. My process, therefore consists essentially in combining the substantial exclusion of chlorides from the raw lithopone with the substantial exclusion of air from this material during its calcination.

I am fully conversant, as will have appeared above, with the fact that calcination with the exclusion of air has been proposed before. Some of the literature on lithopone refers to its calcination in "sealed retorts", or with "exclusion of air", although the reason for the precaution is usually not given. The difference in meaning between these terms and the term "exclusion of air" as used in the present application, is obvious when past practice is considered. Practical development of lithopone muffles has been limited to fire-clay retorts or tile-lined muffle furnaces. Into these the lithopone has been shoveled with the doors open. This of course allowed free access of air to the interior of the muffle. During the course of the calcination the doors are kept closed most of the time but are usually opened for rabbling once or several times, and finally the lithopone is raked out for quenching in a vat of water. Aside from the ingress of air which is possible at these times, the muffle walls themselves are not impermeable to gases. These can diffuse through the walls of the fire-clay retorts, and in muffles with fire-brick or tile walls it is impossible to avoid the development of cracks sooner or later which allow leakage of gases. Hence, the terms "sealed retorts" and "exclusion of air", used in the literature describing the prior art, are merely relative. These terms must be interpreted in the light of the prior art, whereas "exclusion of air" used in the strict sense in the present application has a much more definite meaning.

A further important consideration in the calcination of lithopone is uniform heating. I have found that the pigment must be calcined for just the proper time at a given temperature in order to obtain a product of the optimum quality. If the lithopone is "under-burned" it will not possess a pure white color but will be low in brightness—greyish in shade. With further calcination the color improves until it more nearly approaches "white". (By white I mean possessing 100% brightness and reflecting non-selectively.) If the product is not quenched when this stage is reached but is allowed to remain in the muffle for a somewhat longer time, the phenomenon known as "over-burning" occurs. This affects the color to some extent but is particularly detrimental to the tinting strength and texture of the product. The tinting strength falls away, presumably due to a sintering action, and the texture becomes hard and gritty.

I early realized the difficulty involved in obtaining uniform calcination of the pigment while excluding air therefrom. In many attempts to calcine the chlorine-free pigment in muffles not adapted for agitation of the pigment, non-uniform heating resulted. This is due to the very low heat conductivity of the lithopone. As a consequence, the portions next the heated walls very soon reached the calcination temperature whereas, due to the very slow flow of the heat through the pigment, the interior of the pile reached the calcination temperature very tardily, if at all. There necessarily resulted a condition of over-calcination in one portion of the lithopone, and under-calcination in another. Both of these being deleterious to the quality of the lithopone, it is obvious that calcination under such conditions could not be completely successful. As an illustrative example, I may cite the following:

A fire-clay retort 26 inches wide, 8 inches high and 39 inches deep was set in a combustion chamber heated by city gas. A 6″ layer of lithopone was charged into the retort after the walls had attained a temperature of approximately 750° C. The gas flames were so regulated as to maintain this temperature within close limits. Pyrometers were introduced at various points in the lithopone with the following results. The pigment close to the walls rapidly reached the calcination temperature,—that inside the pile lagged behind very seriously. For example, after two hours heating, the pigment fairly close to, but not in contact with, the bottom of the muffle registered 575° C., whereas that two inches nearer the center had reached only 235° C. The charge was finally quenched after 3½ hours calcination when the pigment next the wall was 750° C. and the temperature in the center only 410° C.

It would be expected from these figures that a considerable proportion of the lithopone in the middle would be underburned (above 600° C. being required for satisfactory calcination). This would result in low strength and greyish off-color. The lithopone next to the walls should not be injuriously affected if no oxygen entered. However, the nature of the muffle allowed some exposure to air, which would naturally result in the yellowish discoloration which, in turn, would be aggravated by the long period of calcination, 3½ hours against one hour or less in ordinary practice. As would be expected from the above considerations, the product obtained from this experimental run was off in color, being low in tint and brightness (grey), and also low in strength, as well.

The obvious remedy for such difficulties was thorough agitation of the pigment during calcination. With agitation the different portions of the charge would successively come in contact with the heated walls of the muffle or other heating means employed. In this way the over-burning of part of the charge, accompanied by under-burning of another portion, would be obviated. Agitation in a retort, at the same time adapted to exclude air, involves however some difficulties in design. A large number of such designs have been considered and some of the more promising ones subjected to test. Examples of apparatus constructed for this purpose are described in my applications Serial Nos. 421,432, 426,350 and 469,132.

A laboratory muffle was designed, allowing complete exclusion of oxygen, the lithopone being stirred mechanically during calcination by a rotating stirrer, the shaft of which passed through a stuffing box. In one representative experiment lithopone was calcined for 45 minutes at a temperature averaging slightly above 750° C. The small bulk of pigment and the stirring doubtless allowed the lithopone to reach very nearly the muffle temperature before quenching. The product was of good color and particularly high in strength.

I am familiar with the fact that previous practice has included rabbling of lithopone during calcination. Such rabbling was, however, accomplished by hand through open doors. This was possible due to the use of pigment containing chlorides which prevented discoloration on contact with the entering air. Hence rabbling by means permitting simultaneous exclusion of air has not been practiced. Such operation is necessary with a raw pigment low in chloride content.

Another precaution of very great practical importance, in addition to agitation,—but taken for the same purpose,—is the crushing of the raw pigment. Agitation takes care of uniform calcination of different parts of the mass. Crushing similarly takes care of uniform calcination of different parts of the same lump of pigment. The necessity for crushing is likewise based on the poor heat conductivity of the lithopone. Due to its low heat conductivity the outer layers of a lump are apt to reach the calcination temperature much earlier than the core. If an effort is made to calcine the pigment in a reasonable length of time, say one hour or less, this is particularly true. The core will be definitely underburned or, if a high enough temperature is applied to yield a well-calcined core, the outer layers will be overburned.

In actual plant operation it has been found that when the precaution of crushing the raw pigment was omitted the product was below standard both in color and strength. The poor color (low brightness) was due to underburning of the core. The low tinting strength (approximately 75% based on an arbitrary standard) was due to the same cause. The pigment fed to the muffle comprised broken press cake containing numerous chunks approximately 1″ cubes. When this material was passed through a small jaw crusher yielding a product of which only 10% was retained on a ¼″ screen, the quality of the calcined pigment showed a radical improvement. The color became "standard" (brightness approximating 89%). The strength likewise rose to 100% of the standard.

The determinations of brightness may be conveniently made with the Pfund multiple reflection colorimeter as described in the Journal of the Franklin Institute, March, 1920, page 371. Pure magnesium oxide prepared by burning magnesium ribbon and collecting the fumes on the colorimeter plates may be used as a standard for brightness. According to the best information of which I am aware at the present time, the brightness of pure magnesium oxide is 98%.

The lithopone sample after being blued as close as possible to non-selectivity is rubbed down with water-white glycerin until a paste of medium consistency is obtained. The paste is then spread onto the colorimeter plates and the brightness is determined as indicated in the publication referred to above. The figures for brightness appearing herein represent the brightness of samples blued practically to non-selectivity in water-white glycerin.

This same improvement could have been largely realized by greatly prolonging the calcination period with very slow heating of the whole mass to the final calcination temperature. This, however, would be a serious disadvantage from the practical standpoint of capacity per unit lithopone muffle. Consequently, crushing may be regarded as a very advantageous, if not absolutely necessary, step in my process.

The prior art in this respect comprises feeding broken press cake to the muffle. The press cake dried in the ordinary tray driers is removed and dumped by hand into a convenient receptacle for transportation to the muffle. Naturally considerable breaking of the cake occurs during this treatment. The point is, however, that no artificial means are taken to crush or break up the cake, nor has the advantage of this been recognized, or at least disclosed, previously. I am familiar with U. S. Patent 1,356,387, dated October 19, 1920, issued to Mitchell, in which it is said: "In my process the precipitate formed by barium sulphate and zinc sulphide is dried and then thoroughly pulverized by grinding or some other means, then placed in an air-tight muffle and calcined at a temperature of from 700 to 950° C.

The definition of pulverized is—"To reduce or become reduced to powder, as by grinding, crushing, etc."—powder—"A collection of minute free particles of a dry substance". There is a wide difference between "crushing" of the raw lithopone to a uniform size and "pulverizing" as defined above. I do not pulverize the pigment as I have found that such treatment has a very definite disadvantage. Thus, calcination of pulverized lithopone in either the ordinary type of muffle, or the type preferred in my operation and described in application of W. J. Lindsay, Serial No. 502,101, results in a high dust loss, the lithopone being carried away by currents of gas. Therefore, while in the process described in the present specification, crushing is a great advantage, pulverizing would from a practical standpoint render the process inoperative.

To produce a raw lithopone free from combined chlorine any one of several alternative procedures may be followed. The three principal alternatives are:

(1) Preparing the zinc liquor (zinc sulphate solution) from raw materials free from chlorides such as spelter.

(2) Starting with zinc raw materials containing insoluble zinc compounds (and which may contain chlorides) and washing the same until free or nearly free from chlorides. Thus "by-product zinc oxide" resulting from reduction operations, in which zinc dust is used as the reducing agent, may be used. This material must first be calcined at a temperature of approximately a low red heat to remove the organic impurities. This calcination may be accomplished in a rotary kiln. Following the calcination step the product may be washed by decantation until the percentage of combined chlorine is below 0.4%. Dissolving the washed product in sulfuric acid will then yield a zinc liquor from which a raw lithopone may be produced by the addition of barium sulphide, the resulting lithopone containing less than .1% combined chlorine.

(3) If neither of the above zinc materials is available so that it becomes a practical necessity to employ a zinc liquor containing an amount of combined chlorine greater than would correspond to .1% based on the lithopone produced therefrom, or if the barium sulphide solution employed contains substantial amounts of combined chlorine, I may resort to washing of the raw lithopone. This may be done by one of the well known methods such as washing by decantation or use of a washing filter press, the washing being continued preferably until the chlorine content is 0.1% or less.

The raw lithopone is precipitated in the customary way by mixing a barium sulphide solution with the solution of zinc sulphate. After such washing as may be necessary, the raw lithopone is dried, and the dried material crushed to a fairly uniform size, for example a size which will enable most of it to pass through a screen having a ¼" mesh; I prefer a crushed product the granules of which have on the average a diameter of about ⅛ of an inch.

The dry granulated lithopone is calcined, usually for about one hour, at a temperature between 600 and 900° C. in the absence of oxygen, and is then quenched while still excluding air. The quenched product is next wet ground, washed several times by decantation, filter pressed, dried, and run through a disintegrator to yield finished lithopone.

When carrying out the calcination in a rotary kiln, such as that described in the application of W. J. Lindsay, Serial No. 502,101, previously referred to, complete exclusion of air is accomplished by burning the gas with a slight deficiency of oxygen and excluding the air from the kiln proper by maintainance of a slight positive pressure. The pigment is crushed prior to introduction into the feeding hopper. Of the crushed pigment appropriately 10% will remain on a ¼" mesh screen, the most of the remainder being coarser than a 20 mesh screen. Agitation of the pigment is accomplished by the rotation of the kiln.

Where care has been taken to maintain the percentage of combined chlorine in the raw pigment below 0.1%, and preferably below 0.02%, a light-resistant product is obtained; and when the other precautions above emphasized have also been observed, and with calcining temperatures close to 800° C., there is produced a finished lithopone which combines light-stability with a hiding power, tinting strength, oil-absorption, and whiteness equal, or superior, to the best lithopone heretofore made.

The lithopone made in the manner above-described was used e. g. in a "flat white" paint formula; wooden panels coated with this paint could be exposed to direct sunlight without visible effect. Parallel exposure under the same conditions and for the same period of an ordinary light-sensitive lithopone resulted in a slate-grey discoloration.

To summarize, my invention comprises the following steps, of which those numbered (1) and (2) are the two most important:

(1) Elimination of chlorides from the raw pigment.
(2) Calcination and quenching with exclusion of air.
(3) Agitation during calcination.
(4) Crushing of the raw pigment.

Step (1)—Elimination of chlorides from the raw pigment—should be interpreted to mean reducing the chloride content of the material sufficiently to yield a product of the desired light-stability. More specifically this will mean reduction of the percentage of combined chloride to approximately 0.1% or below. Further reduction from 0.1% downward is necessary according to the degree of light-resistance desired. The practical limit is around .01%. A further decrease may be accomplished only at a considerable cost.

Step (2)—Calcination and quenching with exclusion of air—is not to be understood as requiring that oxygen must be entirely eliminated from the atmosphere within the muffle. This is obviously impossible inasmuch as small amounts of oxygen dissolved in the quenched lithopone must make their way up into the muffle; likewise air occluded or absorbed by the raw pigment will introduce minimal quantities of oxygen. What I wish to make clear is that there shall be no unprotected opening in the muffle where air can freely enter, (where avoidance of openings is impracticable, care should be taken to make them as air-tight as possible, or otherwise prevent entrance of air) and that the unavoidable entrance of air shall not raise the percentage of oxygen in the muffle higher than 1% for any period of appreciable duration. It is understood that in operating under the process claimed the percentage of oxygen should be maintained at as low a figure as possible and that amounts increasing above approximately 0.1% will progressively discolor the product with a deepening yellow tint.

The other two steps—(3) agitation during calcination and (4) crushing of the raw pigment—are in the nature of refinements in the process. Without them saleable pigment can still be produced. For the highest quality and greatest economy in operation, however, these steps are required. An amount of agitation at least equivalent to that corresponding to one revolution per minute of a rotating muffle is best, although slower uniform agitation or even discontinuous stirring is satisfactory with certain types of muffles. My invention therefore, includes agitation, continuously or discontinuously, by any suitable means adapted to permit exclusion of air during the calcination.

The amount of crushing to which the pigment should be subjected should best be such that not over 10% remain on a screen of ¼" square mesh. Likewise the least possible amount should pass through 100 mesh. However, it will be understood that any degree of crushing less than the above will improve the quality of the product. Consequently, my invention includes the use of pigment crushed to any extent by passage through suitable means such as a jaw or roll crusher; such pigment to be used in the process already described.

I claim:

1. The process of making lithopone which comprises calcining at temperatures of about 800° C., with exclusion of air, raw lithopone containing less than 0.1% of combined chlorine.

2. The process of making lithopone which comprises calcining at temperatures of from about 750 to 800° C., with exclusion of air, raw lithopone containing less than 0.1% of combined chlorine.

3. The process of making lithopone which comprises calcining and quenching, with exclusion of air, raw lithopone containing less than 0.1% of combined chlorine, the temperature of calcination being between 750 and 900° C.

4. The process of making lithopone which comprises calcining, at temperatures between 750 and 900° C., with exclusion of air, raw lithopone containing less than 0.03% of combined chlorine.

5. The process of making lithopone which is strongly resistant to the action of light and which has a whiteness at least equal to that of a high grade commercial lithopone, which comprises calcining and quenching, with exclusion of air, raw lithopone containing less than 0.02% of combined chlorine, the temperature of calcination being between 750 and 900° C.

6. The process of making lithopone which comprises concurrently calcining and agitating, with exclusion of air, raw lithopone containing less than 0.1% of combined chlorine.

7. The process of making a lithopone which comprises concurrently calcining and agitating, with exclusion of air, raw lithopone containing less than 0.1% of combined chlorine, the temperature of calcination being between 750 and 900° C.

8. The process of making lithopone which comprises calcining, with exclusion of air, a granular mass of raw lithopone containing less than 0.1% of combined chlorine, the major portion of said mass being able to pass through a screen of ¼ inch mesh, but unable to pass through a 20 mesh screen.

9. In the process of making lithopone the step which comprises crushing dry raw lithopone sufficiently to form a granular mass of fairly uniform size, the major portion of said mass being able to pass through a screen of ¼ inch mesh, but unable to pass through a 20 mesh screen.

10. The process of making lithopone which comprises calcining with exclusion of air a raw lithopone containing between 0.05 and 0.009% of combined chlorine.

11. The process of making lithopone which comprises calcining, at temperatures of approximately 800° C., with exclusion of air, a raw lithopone containing between 0.05% and 0.009% of combined chlorine.

12. The process of making lithopone which comprises calcining at temperatures of from about 650 to 900° C., with exclusion of air, a raw lithopone containing between .03 and .009% of combined chlorine.

13. As a new composition of matter a lithopone pigment which is light-resistant and which has a whiteness, tinting strength, and hiding power at least equal to that obtainable by the ordinary lithopone process involving calcination of raw lithopone containing about 0.1% of combined chlorine.

14. As a new composition of matter a light-resistant lithopone possessing a brightness of at least 89% and obtainable by calcining and quenching, in the absence of oxygen, a crushed raw lithopone containing less than 0.1% of combined chlorine, and then subjecting the quenched product to the customary finishing operations.

15. As a new composition of matter a light-resistant lithopone having a whiteness with no more than the minimum yellow tint and having a brightness of at least 89%.

16. As a new composition of matter a light-resistant lithopone possessing a brightness of at least 92%, containing less than 0.03% of combined chlorine, and being obtainable by calcining and quenching, in the absence of oxygen, a crushed raw lithopone containing less than 0.03% of combined chlorine, and then subjecting the quenched product to the customary finishing operations.

17. As a new composition of matter a light-resistant lithopone possessing a brightness of at least 92%, containing less than 0.02% of combined chlorine, and being obtainable by calcining and quenching, in the absence of oxygen, a crushed raw lithopone containing less than 0.02% of combined chlorine, and then subjecting the quenched product to the customary finishing operations.

In testimony whereof I affix my signature.

JAMES ELIOT BOOGE.